United States Patent
Ohno

(10) Patent No.: US 9,903,554 B2
(45) Date of Patent: Feb. 27, 2018

(54) VEHICLE LIGHTING FIXTURE

(71) Applicant: Stanley Electric Co., Ltd., Tokyo (JP)

(72) Inventor: Masafumi Ohno, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/174,153

(22) Filed: Jun. 6, 2016

(65) Prior Publication Data

US 2016/0356444 A1    Dec. 8, 2016

(30) Foreign Application Priority Data

Jun. 8, 2015    (JP) ................................. 2015-115378

(51) Int. Cl.
*B60Q 1/00*    (2006.01)
*B60Q 3/00*    (2017.01)
(Continued)

(52) U.S. Cl.
CPC .......... *F21S 48/125* (2013.01); *B60Q 1/0483* (2013.01); *F21S 48/115* (2013.01);
(Continued)

(58) Field of Classification Search
CPC .... F21S 48/125; F21S 48/1163; F21S 48/217; F21S 48/215; F21S 48/1275;
(Continued)

(56) References Cited

U.S. PATENT DOCUMENTS

| 5,138,540 A | 8/1992 | Kobayashi et al. |
| 5,388,035 A * | 2/1995 | Bodem, Jr. .......... B60Q 1/2696 362/240 |

(Continued)

FOREIGN PATENT DOCUMENTS

| EP | 0 984 220 A1 | 3/2000 |
| EP | 1 270 324 A2 | 1/2003 |

(Continued)

OTHER PUBLICATIONS

Machine English Translation of EP2012056A1 Reiss et al. Jan. 7, 2009.*

(Continued)

*Primary Examiner* — Elmito Breval
*Assistant Examiner* — Glenn Zimmerman
(74) *Attorney, Agent, or Firm* — Kenealy Vaidya LLP

(57) ABSTRACT

A vehicle lighting fixture can control the light distribution with higher accuracy while suppressing the light intensity unevenness of the light distribution even with a plurality of light sources used. The vehicle lighting fixture can include: a plurality of LED elements arranged in a vertical direction and a lateral direction; a projector lens assembly including two projector lenses disposed in front of the plurality of LED elements and configured to project light emitted from the plurality of LED elements forward; and an image shifter disposed in an optical path from the plurality of LED elements to a position forward of the projector lenses. The image shifter can include a plurality of prisms configured to widen light source images of the plurality of LED elements in the vertical and lateral directions.

10 Claims, 9 Drawing Sheets

(51) Int. Cl.
   *F21S 8/10*     (2006.01)
   *B60Q 1/04*     (2006.01)
   *F21V 5/00*     (2018.01)
   *F21Y 101/02*   (2006.01)

(52) U.S. Cl.
   CPC ....... *F21S 48/1154* (2013.01); *F21S 48/1163* (2013.01); *F21S 48/1225* (2013.01); *F21S 48/1275* (2013.01); *F21S 48/215* (2013.01); *F21S 48/217* (2013.01); *F21S 48/2212* (2013.01); *F21V 5/005* (2013.01); *F21S 48/1747* (2013.01); *F21Y 2101/02* (2013.01)

(58) Field of Classification Search
   CPC ............... F21S 48/1154; F21S 48/1225; F21S 48/2212; F21S 48/115; F21S 48/1747; B60Q 1/0483; F21V 5/005; F21Y 2101/02
   USPC .................................................. 362/520, 538
   See application file for complete search history.

(56) References Cited

U.S. PATENT DOCUMENTS

| | | |
|---|---|---|
| 2001/0019486 A1 | 9/2001 | Thominet |
| 2004/0075897 A1* | 4/2004 | Ookawa ................. G02B 5/045 |
| | | 359/455 |
| 2006/0198118 A1 | 9/2006 | Eichhorn et al. |

FOREIGN PATENT DOCUMENTS

| | | |
|---|---|---|
| EP | 2 012 056 A1 | 1/2009 |
| JP | 2001-266620 A | 9/2001 |
| JP | 2006-522440 A | 9/2006 |
| WO | 86/05254 A1 | 9/1986 |
| WO | 2015/075668 A1 | 5/2015 |

OTHER PUBLICATIONS

Extended European search report for the related European Patent Application No. 16173255.7 dated Oct. 14, 2016.

\* cited by examiner

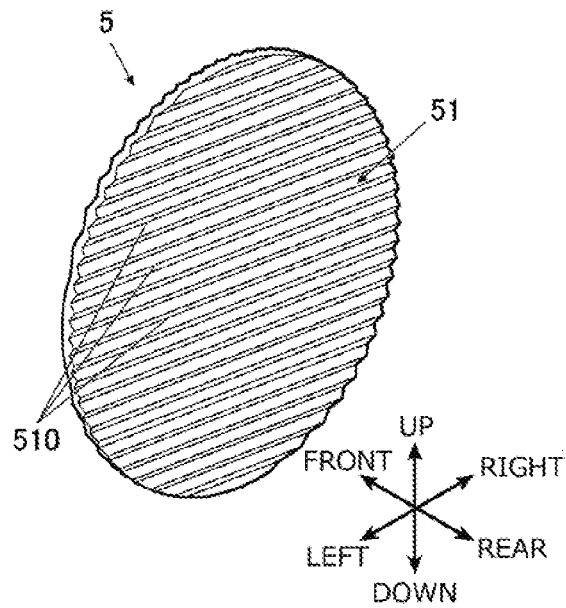
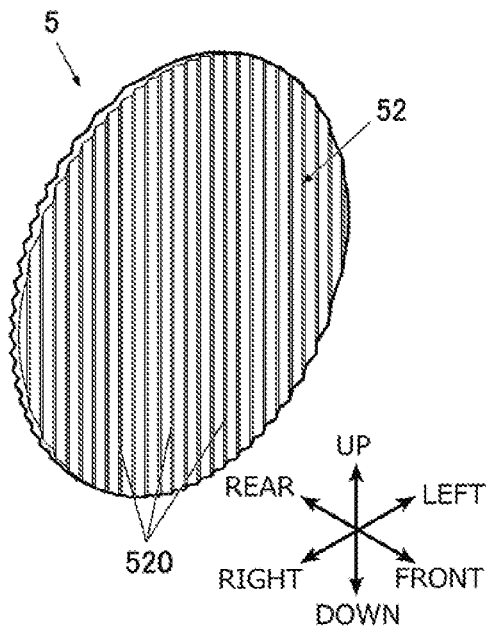
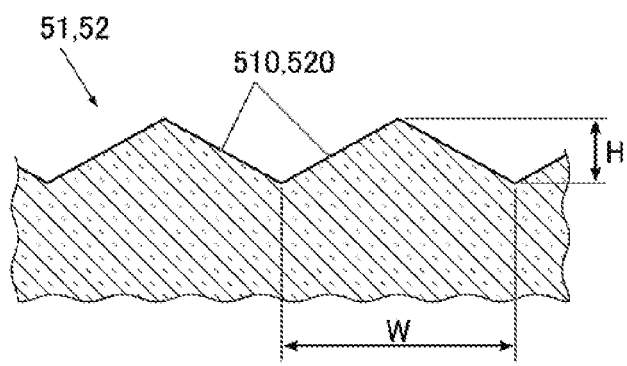

FIG. 8A
FIG. 8B
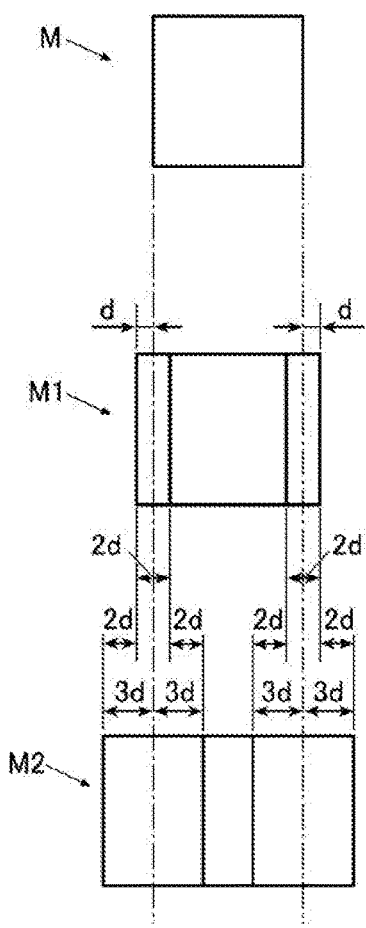
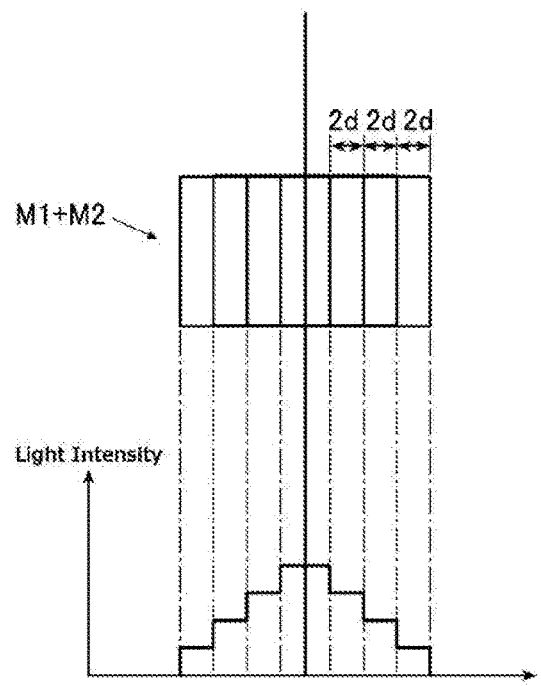

FIG. 9

|  |  | First Projector Lens | Second Projector Lens |
|---|---|---|---|
| Refractive Index | | 1.5168 | 1.5168 |
| Outer Diameter [mm] | | 50 | 50 |
| Thickness [mm] | | 10 | 10 |
| Distance from LED array [mm] | | 50 | 68 |
| Curvature | Incident Surface | -180 | -350 |
| | Exiting Surface | -50 | -53 |
| Aspheric Coefficient | Incident Surface | 9 | 12 |
| | Exiting Surface | -1 | 0 |

VEHICLE LIGHTING FIXTURE

This application claims the priority benefit under 35 U.S.C. § 119 of Japanese Patent Application No. 2015-115378 filed on Jun. 8, 2015, which is hereby incorporated in its entirety by reference.

TECHNICAL FIELD

The presently disclosed subject matter relates to vehicle lighting fixtures to be mounted on a vehicle body, and in particular, to a vehicle lighting fixture including a plurality of light sources arranged in a predetermined direction.

BACKGROUND ART

There are conventionally known vehicle lighting fixtures to be mounted on a vehicle body having a plurality of light sources such as light emitting diodes arranged, for example, those described in Japanese Patent Application Laid-Open No. 2001-266620 (or U.S. 2001/0019486 A1 corresponding thereto). In recent years, variable light distribution type headlamps that can change its light distribution according to the surrounding environment have been widespread. In general, this type of vehicle lighting fixture can be configured to include a number of light emitting diodes that can be independently controlled to be turned ON/OFF.

When a plurality of light sources are arranged, it is absolutely difficult to dispose the plurality of light sources without any gap therebetween. Thus, if such a plurality of light sources with a gap therebetween are turned on, the irradiation area may include darkened areas due to the gaps between the adjacent light sources, thereby resulting in light intensity unevenness in the produced light distribution pattern. When such a vehicle lighting fixture is used as a headlamp or a signal light, there may be a case of lowering the visibility of a driver or misunderstanding of driving conditions by a driver. This results in destructing the safety of driving.

To cope with this problem, Japanese Patent Application Laid-Open No. 2006-522440 (or U.S. 2006/0198118 A1 corresponding thereto) describes a vehicle lighting fixture in which a number of semiconductor light sources arranged on a substrate are covered with a light-transmitting chip cover. Furthermore, the chip cover is filled with a light-scattering and/or light-converting auxiliary material. As a result, the light from the semiconductor light sources can be diffused by the auxiliary material, to thereby suppress the light intensity unevenness in the light distribution.

However, the vehicle lighting fixture of Japanese Patent Application Laid-Open No. 2006-522440 (or U.S. 2006/0198118 A1 corresponding thereto) utilizes the diffusion function of light by the auxiliary material, it is difficult to control the degree of diffusion. Thus, when the disclosed vehicle lighting fixture is applied to a variable light distribution type headlamp, the light from the turned-on light source may be unintentionally directed in an optical path from a turned-off light source. In this case, an accurate light control may be hindered.

SUMMARY

The presently disclosed subject matter was devised in view of these and other problems and features in association with the conventional art. According to an aspect of the presently disclosed subject matter, a vehicle lighting fixture can control the light distribution with higher accuracy while suppressing the light intensity unevenness of the light distribution even with a plurality of light sources used.

According to another aspect of the presently disclosed subject matter, a vehicle lighting fixture can include: a plurality of light sources having a light emitting direction and arranged in a predetermined arranging direction orthogonal to the light emitting direction; a projector lens assembly disposed in front of the plurality of light sources and configured to project light emitted from the plurality of light sources forward; and an optical lens disposed in an optical path from the plurality of light sources to a position forward of the projector lens assembly, the optical lens including a plurality of prisms configured to widen light source images of the plurality of light sources in the predetermined arranging direction.

In the vehicle lighting fixture with the above-described configuration, the plurality of prisms can each extend in a direction orthogonal to the arranging direction and be disposed side by side in the arranging direction.

In the vehicle lighting fixture with the above-described configuration, the plurality of prisms can each be formed to have a triangular cross section orthogonal to the direction in which the prisms extend, and can include two types of prisms having mutually different base angles in the triangular cross section, and the two types of prisms can be configured such that a ratio of the base angles is 3:1.

In the vehicle lighting fixture with any of the above-described configurations, the plurality of light sources can be arranged in a matrix form in two arranging directions substantially orthogonal to each other, and the optical lens can have two sets of the plurality of prisms corresponding to the two arranging directions and formed in front and rear surfaces of the optical lens.

In the vehicle lighting fixture with any of the above-described configurations, the projector lens assembly can include two projector lenses provided adjacent to each other in the light emitting direction (front-rear direction), and the optical lens can be disposed in between the two projector lenses.

According to the presently disclosed subject matter, the light source images of the plurality of light sources can be widened in the predetermined arranging direction of the light sources by the plurality of prisms provided to the optical lens.

This configuration can suppress the formation of darkened areas formed corresponding to the gaps between the adjacent light sources, and in turn, prevent the light intensity unevenness in the produced light distribution pattern. Appropriate adjustment of the shape and arrangement of the prisms can achieve more accurate light distribution control.

Thus, the vehicle lighting fixture with the above-mentioned configuration can control the light distribution with higher accuracy while suppressing the light intensity unevenness of the light distribution even with the plurality of light sources used.

BRIEF DESCRIPTION OF DRAWINGS

These and other characteristics, features, and advantages of the presently disclosed subject matter will become clear from the following description with reference to the accompanying drawings, wherein:

FIGS. 3A, 3B, and 3C are diagrams for describing an image shifter used in the presently disclosed subject matter where FIG. 3A is a perspective view of the image shifter when seen from its rear side, FIG. 3B is a perspective view of the image shifter when seen from its front side, and FIG. 3C is a partial cross-sectional view of its surface prisms;

FIG. 6A is a perspective view of the image shifter when seen from its rear side, FIG. 6B is a perspective view of the image shifter when seen from its front side, and FIG. 6C is a partial cross-sectional view of its surface prisms;

FIG. 8A is a schematic diagram for explaining how the projected image is formed when the ratio of base angles of two types of prisms is 3:1, and FIG. 8B is a schematic diagram for explaining the resulting light intensity distribution formed; and FIG. 9 is a table 1 showing the specifications of the two projector lenses 3 and 4.

DESCRIPTION OF EXEMPLARY EMBODIMENTS

A description will now be made below to vehicle lighting fixtures of the presently disclosed subject matter with reference to the accompanying drawings in accordance with exemplary embodiments.

Figure 1:
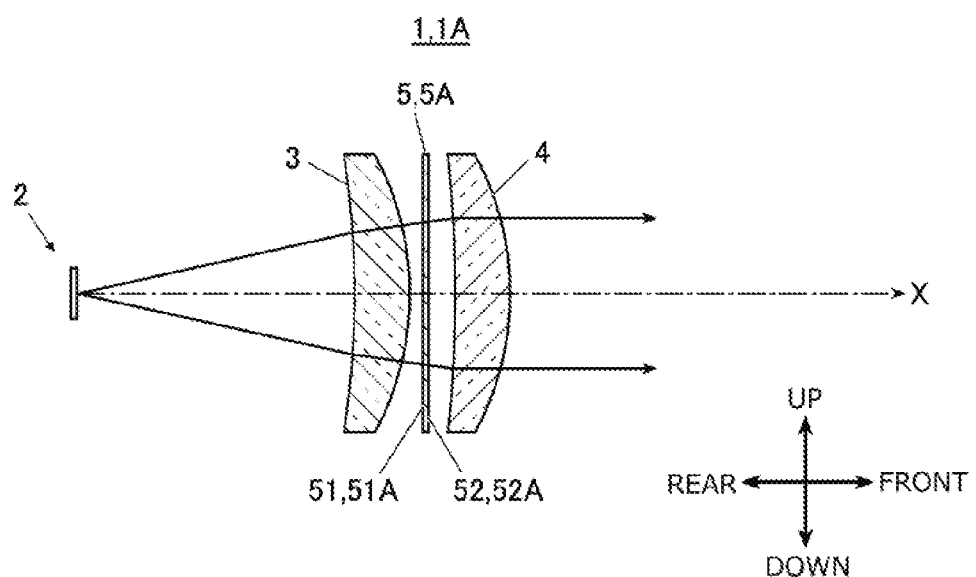
FIG. 1 is a cross-sectional view illustrating essential parts of a vehicle lighting fixture made in accordance with principles of the presently disclosed subject matter.
Figure 2:
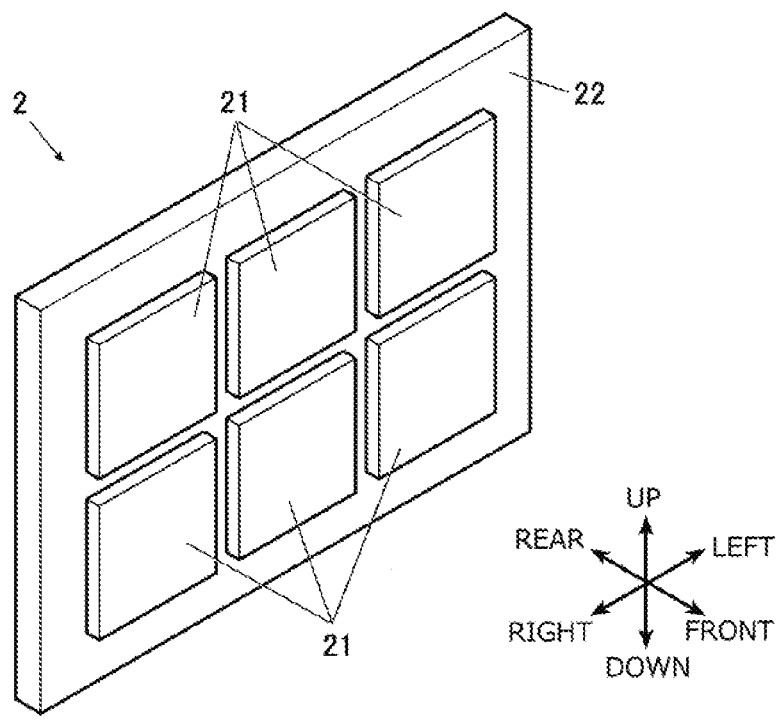
FIG. 2 is a perspective view illustrating an LED array.

FIG. 1 is a cross-sectional view illustrating essential parts of a vehicle lighting fixture 1 made in accordance with the principles of the presently disclosed subject matter, and FIG. 2 is a perspective view illustrating an LED array included in the vehicle lighting fixture 1. FIGS. 3A, 3B, and 3C are diagrams for describing an image shifter 5 that can be provided to the vehicle lighting fixture 1. FIG. 3A is a perspective view of the image shifter 5 when seen from its rear side. FIG. 3B is a perspective view of the image shifter 5 when seen from its front side, and FIG. 3C is a partial cross-sectional view of its prisms formed in the surface of the image shifter 5. Note that in FIG. 3C, the ratio of the height to the width of the illustrated prism is made larger than that in an actual case.

The vehicle lighting fixture 1 can be installed in a vehicle body not illustrated, and can be a headlamp to be mounted on a front portion of a vehicle body in the present exemplary embodiment.

Specifically, as illustrated in FIG. 1, the vehicle lighting fixture 1 can include an LED (light emitting diode) array 2, a projector lens assembly including two projector lenses 3 and 4, and the image shifter 5 disposed between the projector lenses 3 and 4. They can be arranged in an optical axis X of the vehicle lighting fixture 1 extending in a front-rear direction.

As illustrated in FIG. 2, the LED array 2 can be configured to include a plurality of (six in the illustrated embodiment) LED elements 21 mounted on a front surface of a planar substrate 22 disposed perpendicular to the front-rear direction. The plurality of LED elements 21 can be arranged in a matrix form, i.e., two rows by three columns, while front light emitting surfaces thereof are directed forward in the optical axis X.

In the present exemplary embodiment, each of the LED elements 21 can have a square shape of about 1 mm and emit light with luminous flux of 200 lm. They can be arranged at intervals of about 0.2 mm.

As illustrated in FIG. 1, the two projector lenses 3 and 4 can be a first projector lens 3 on the rear side (closer to the LED array 2) and a second projector lens 4 on the front side, and be arranged adjacent to each other in the front-rear direction in front of the LED array 2. The projector lens assembly including the two projector lenses 3 and 4 as a whole can have a rear-side focal point at or near a position where the LED array 2 is located and a front-side focal point closer to a projected light source image (at a position approximately 25 m away from the lens in the present exemplary embodiment). The projector lens assembly can project light emitted from the LED array 2 (the plurality of LED elements 21) forward. The two projector lenses 3 and 4 can each be a convexo-concave lens having a convex front surface and a concave rear surface.

The specifications of the two projector lenses 3 and 4 in the present exemplary embodiment are shown in the following table 1 of FIG. 9. In the table 1, the "thickness" and "distance" used mean to be respective lengths on the optical axis X, and the "distance from LED array" means to be a distance from the LED array 2 to each rear surface (incident surface) of the projector lenses 3 and 4.

The image shifter 5 can be an optical lens disposed in between the projector lenses 3 and 4. As described later, the image shifter 5 can be configured to refract the light emitted from the plurality of LED elements 21 of the LED array 2 in an arranging direction of the plurality of LED elements 12 (i.e., in the vertical direction and left-right direction) so as to widen the light source image of the plurality of LED elements 21.

In the present exemplary embodiment, the image shifter 5 can be formed substantially in a disk shape with a thickness of about 1 mm and an outer diameter of about 50 mm, and disposed at a position about 3 mm away from the front surface (the exiting surface) of the first projector lens 3.

As illustrated in FIG. 3A, a plurality of vertically arranged prisms 510 can be formed in a rear surface (incident surface) 51 of the image shifter 5 so that the light source image is widened in the vertical direction. The plurality of vertically arranged prisms 510 can be arranged side by side in the vertical direction and extend in the left-right direction with a particular cross section to be described later.

Furthermore, as illustrated in FIG. 3B, a plurality of laterally arranged prisms 520 can be formed in a front surface (exiting surface) 52 of the image shifter 5 so that the light source image is widened in the lateral direction. The plurality of laterally arranged prisms 520 can be arranged side by side in the left-right direction and extend in the vertical direction with a particular cross section to be described later.

These vertically arranged prisms 510 and laterally arranged prisms 520 can have an isosceles triangle cross section perpendicular to the direction in which the prisms extend. In the illustrated exemplary embodiment in FIG. 3C, the height H of the isosceles triangle can be about 1.6 μm and the width W thereof can be about 1 mm.

Note that the vertically arranged prisms 510 and laterally arranged prisms 520 can formed in any of the front and rear surfaces of the image shifter 5. Thus, the plurality of vertically arranged prisms 510 may be formed in the front surface 52 of the image shifter 5 while the plurality of laterally arranged prisms 520 may be formed in the rear surface 51 of the image shifter 5.

A description will now be given of the projected image, i.e., the light distribution pattern, by the vehicle lighting fixture 1.

Figure 4A:
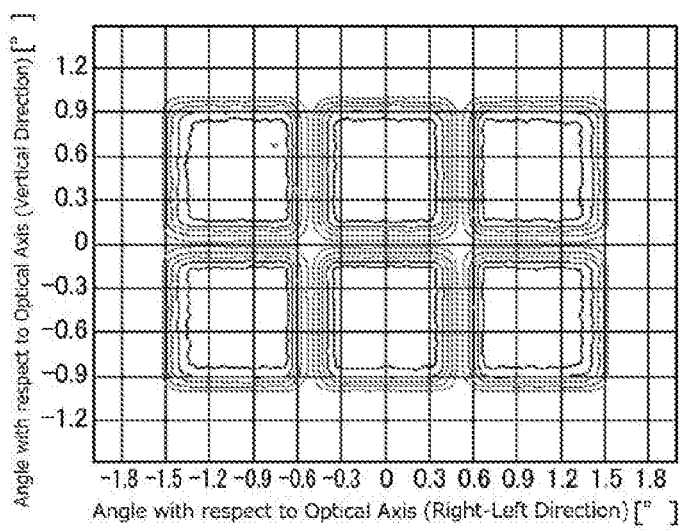
FIGS. 4A, 4B, and 4C are diagrams illustrating a case where the image shifter of a vehicle lighting fixture according to a comparative example is a simple flat plate, FIG. 4A being a graph showing a light intensity distribution of a projected image on a virtual vertical screen, FIG. 4B being a graph showing the light intensity distribution in a left-right direction, and FIG. 4C being a graph showing the light intensity distribution in a vertical direction.
Figure 4B:
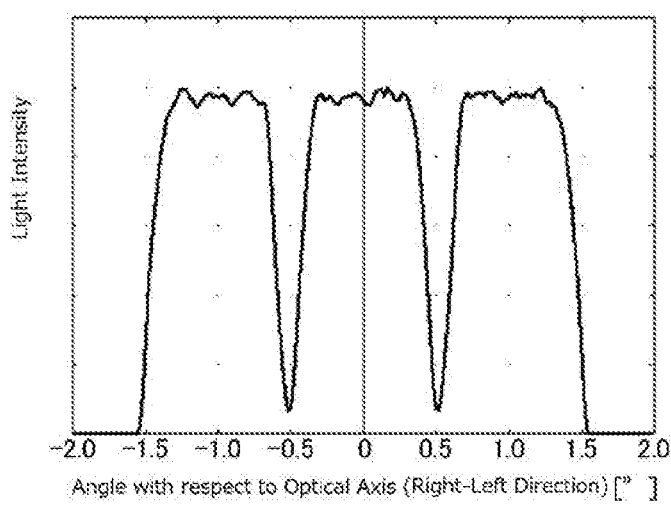
Figure 4C:
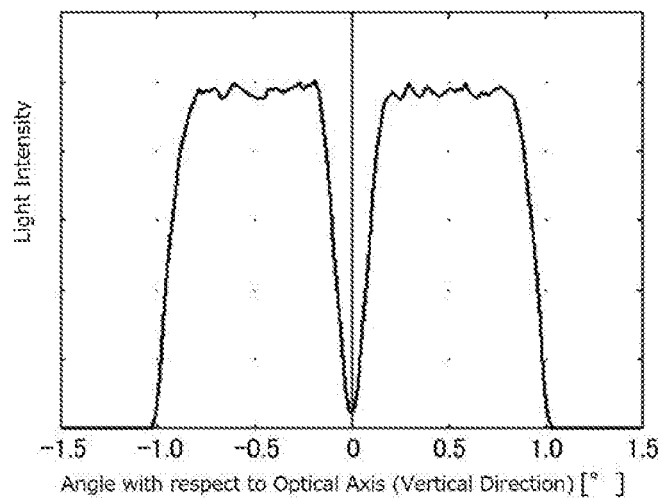
Figure 5A:
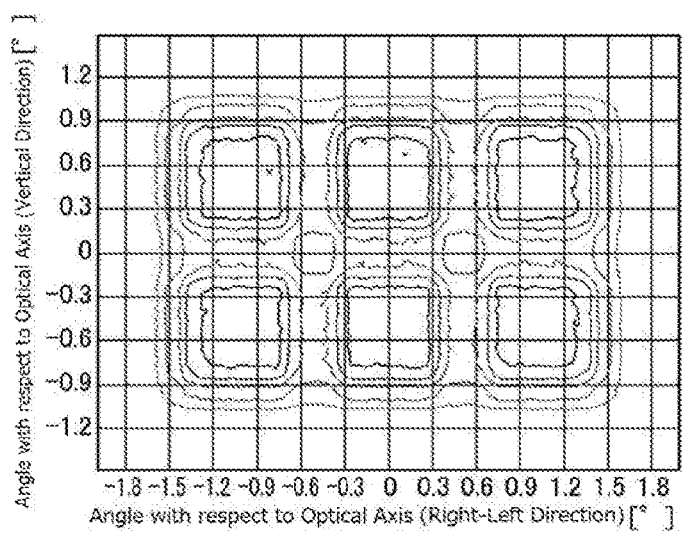
FIGS. 5A, 5B, and 5C are diagrams illustrating a case where the image shifter of a vehicle lighting fixture according to the exemplary embodiment of the presently disclosed subject matter is used, FIG. 5A being a graph showing a light intensity distribution of a projected image on a virtual vertical screen, FIG. 5B being a graph showing the light intensity distribution in a left-right direction, and FIG. 5C being a graph showing the light intensity distribution in a vertical direction.
Figure 5B:
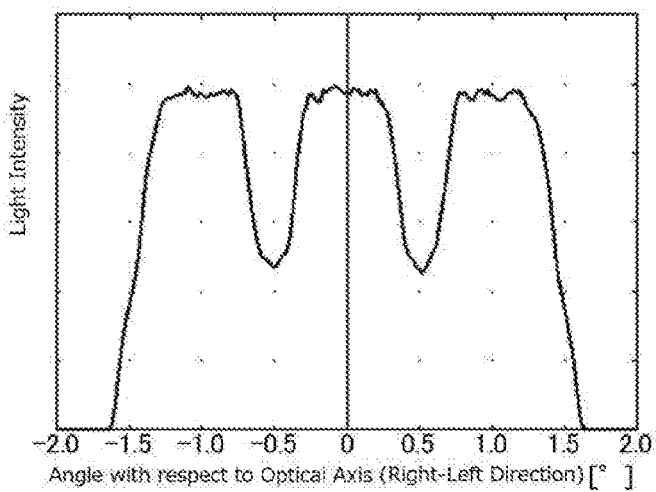
Figure 5C:
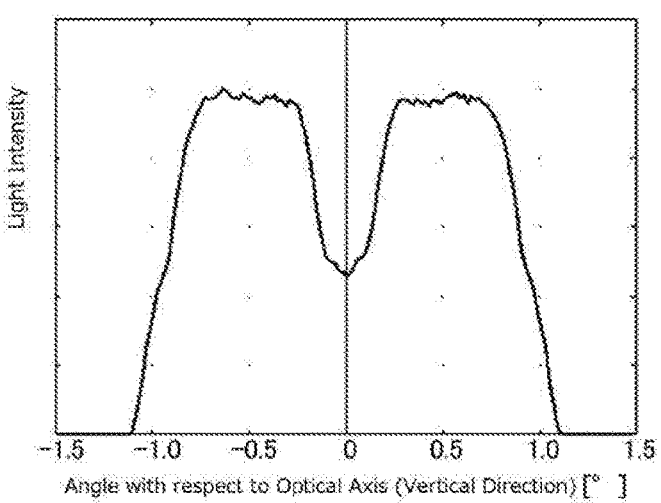

FIGS. 4A to 4C and 5A to 5C are diagrams showing light intensity distributions formed on a virtual vertical screen about 25 meters away from the front portion of the vehicle lighting fixture 1 when the image shifter 5 is a simple flat plate (4A to 4C) and when the image shifter 5 is made in accordance with the principles of the presently disclosed subject matter (5A to 5C), respectively. FIGS. 4A and 5A are each a diagram illustrating the light intensity distribution of a projected image on the virtual vertical screen, FIGS. 4B and 5B are each a diagram illustrating the light intensity distribution of the projected image in the left-right direction at a position of −0.5° below the optical axis X (vertically −0.5° position), and FIGS. 4C and 5C are each a diagram illustrating the light intensity distribution of the projected image in the vertical direction at a position passing the optical axis X (laterally 0° position).

In the vehicle lighting fixture 1, the light emitted forward from the plurality of LED elements 21 of the LED array 2 can be projected forward by the two projector lenses 3 and 4 to form a predetermined projected image (light distribution pattern) in front of the lighting fixture. The projected image formed in this case can be obtained by changing the light source image by the image shifter 5 disposed in between the two projector lenses 3 and 4.

When the image shifter is a simple flat plate without any prism, as illustrated in FIGS. 4A, 4B, and 4C, the projected image can be formed to directly correspond to the arrangement of the plurality of LED elements 21. Specifically, the gaps between the plurality of LED elements 21 are reflected as the darkened areas so that the produced projected image includes light intensity unevenness. No image shifter may result in the formation of the same projected image as that with the flat plate image shifter.

On the contrary, the vehicle lighting fixture 1 of the present exemplary embodiment can widen the light source image in the vertical and lateral directions since the image shifter 5 can include the vertically arranged prisms 510 and the laterally arranged prisms 520. Specifically, plurality of vertically arranged prisms 510 formed in the rear surface 51 of the image shifter 5 can widen the light source image in the vertical direction while the plurality of laterally arranged prisms 520 formed in the front surface 52 of the image shifter 5 can widen the light source image in the lateral direction.

As a result, as illustrated in FIGS. 5A to 5C, the projected image formed in front of the lighting fixture 1 may have darkened areas corresponding to the gaps between the plurality of LED elements 21, but the valley of the darkened area is shallower than that formed by the simple flat plate image shifter. That is, the darkened area has a certain light intensity higher than that formed by the simple flat plate image shifter, resulting in suppression of light intensity unevenness.

As described above, the vehicle lighting fixture 1 of the present exemplary embodiment can widen the light source image of the plurality of LED elements 21 by the plurality of prisms formed in the image shifter 5 in the arranging direction of the plurality of LED elements 21.

This configuration of the vehicle lighting fixture 1 can suppress the formation of darkened areas formed corresponding to the gaps between the adjacent LED elements, and in turn, prevent the light intensity unevenness in the produced light distribution pattern. Furthermore, appropriate adjustment of the shape and arrangement of the prisms can achieve more accurate light distribution control.

Thus, the vehicle lighting fixture 5 with the above-mentioned configuration can control the light distribution with higher accuracy while suppressing the light intensity unevenness of the light distribution even with the plurality of LED elements 21 used.

Note that it is not necessary that the plurality of LED elements 21 are arranged in a matrix form in the vertical and lateral directions, but the plurality of LED elements 21 may be arranged in a direction(s) orthogonal to the light emitting direction of the light source. Thus, the plurality of LED elements 21 may be arranged in an obliquely front-rear direction, in a single direction, or in two directions which are not orthogonal to each other.

Even when the plurality of LED elements 21 are arranged in a various direction(s), the plurality of prisms 510 and 510 can be appropriately disposed to widen the light source image of the plurality of LED elements 21 in a direction(s) in which the plurality of LED elements 21 are arranged.

The position of the image shifter 5 is not limited to the above-mentioned position, but may be any position as long as it is within the optical path from the LED array 2 to the position just in front of the two projector lenses 3 and 4. Also in this case, it is preferable to dispose the image shifter 5 in a position where the light rays are as parallel as possible to the optical axis X.

The number of the projector lenses included in the projector lens assembly is not limited to two but may be one or three or more.

A description will now be given of a modified example of the above-described exemplary embodiment. The same components of the modified example will be denoted by the same reference numerals of the exemplary embodiment and descriptions thereof will be omitted as appropriate.

Figure 6A:
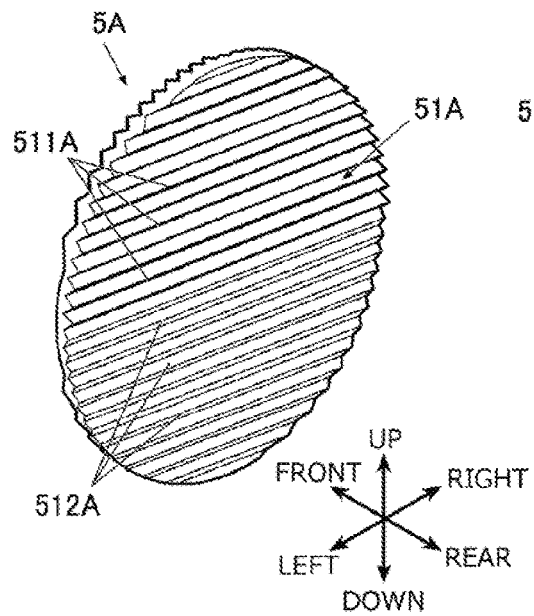
FIGS. 6A, 6B, and 6C are diagrams for describing an image shifter according to a modified example of the exemplary embodiment of the presently disclosed subject matter where
Figure 6B:
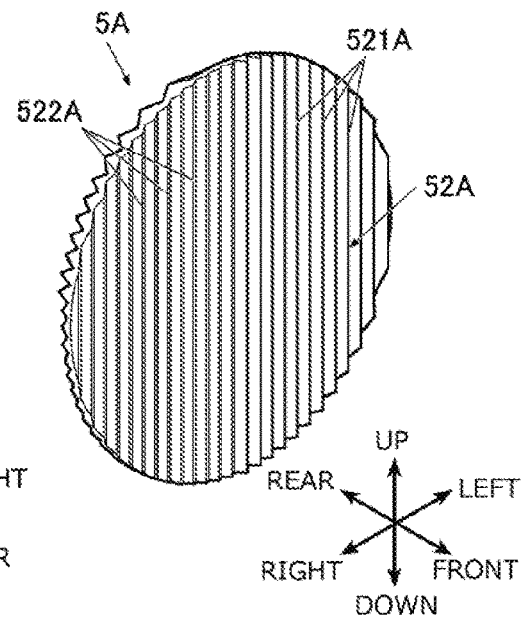
Figure 6C:
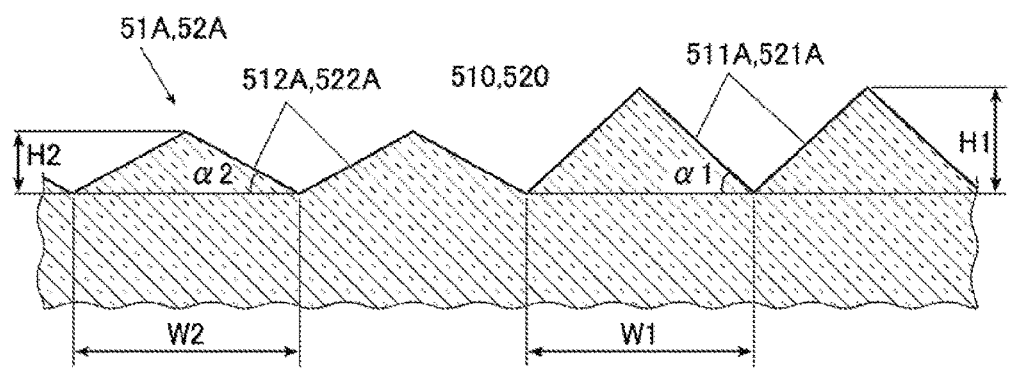

The modified example can be that shown in FIG. 1 as a vehicle lighting fixture 1A. FIGS. 6A, 6B, and 6C are diagrams for describing an image shifter 5A that can be provided to the vehicle lighting fixture 1A. FIG. 6A is a perspective view of the image shifter 5A when seen from its rear side, FIG. 6B is a perspective view of the image shifter 5A when seen from its front side, and FIG. 6C is a partial cross-sectional view of its prisms formed in the surface of the image shifter 5A. Note that in FIG. 6C, the ratio of the height to the width of the illustrated prism is made larger than that in an actual case.

As illustrated in FIG. 1, the vehicle lighting fixture 1A is different from the vehicle lighting fixture 1 of the above-described exemplary embodiment in that the vehicle lighting fixture 1A can include the image shifter 5A in place of the image shifter 5.

The image shifter 5A is different from the image shifter 5 of the above-described exemplary embodiment in that the image shifter 5A can include uneven prisms formed in respective surfaces thereof.

Specifically, the prisms formed in the rear surface 51A of the image shifter 5A as illustrated in FIG. 6A can include a plurality of vertically arranged first prisms 511A and a plurality of vertically arranged second prisms 512A. The vertically arranged first prisms 511A can be formed in the upper half of the circle of the rear surface 51A of the image shifter 5A while the vertically arranged second prisms 512A can be formed in the lower half thereof. The vertically arranged first and second prisms 511A and 512A can be arranged side by side in the vertical direction in the respective semi-circle area and extend in the left-right direction with a particular cross section to be described later.

These vertically arranged first and second prisms 511A and 512A can have an isosceles triangle cross section perpendicular to the direction in which the prisms extend. In the illustrated exemplary embodiment in FIG. 6C, the widths W1 and W2 thereof can be equal to each other (about 1 mm in the illustrated modified example). The height H1 of the vertically arranged first prisms 511A can be made larger than the height H2 of the vertically arranged second prisms 512A. In the illustrated modified example, the height H2 is about 1.6 μm whereas the height H1 is about 4.8 μm which is about three times the height H2. In other words, the base angle α1 of the isosceles triangle cross section of the first prisms 511A can be made larger than the base angle α2 of the isosceles triangle cross section of the second prisms 512A. In the illustrated modified example, the ratio of the base angles α1 and α2 is about 3:1.

Furthermore, the prisms formed in the front surface 52A of the image shifter 5A as illustrated in FIG. 6B can include a plurality of laterally arranged first prisms 521A and a plurality of laterally arranged second prisms 522A. The laterally arranged first prisms 521A can be formed in the left half of the circle of the front surface 52A of the image shifter 5A while the laterally arranged second prisms 522A can be formed in the right half thereof. The laterally arranged first and second prisms 521A and 522A can be arranged side by side in the lateral direction in the respective semi-circle area and extend in the vertical direction with a particular cross section to be described later.

As illustrated in FIG. 6C, these laterally arranged first and second prisms 521A and 522A can be configured in the same manner as the vertically arranged first and second prisms 511A and 512A in the rear surface 51A. Specifically, these laterally arranged first and second prisms 521A and 522A can have an isosceles triangle cross section perpendicular to the direction in which the prisms extend. In the illustrated exemplary embodiment in FIG. 6C, the widths W1 and W2 thereof can be equal to each other (about 1 mm in the illustrated example). The height H1 of the laterally arranged first prisms 521A can be made larger than the height H2 of the laterally arranged second prisms 522A. In the illustrated modified example, the height H1 is about three times the height H2 (for example, the height H1 can be about 4.8 μm and the height H2 can be about 1.6 μm). In other words, the base angle α1 of the isosceles triangle cross section of the first prisms 521A can be made larger than the base angle α2 of the isosceles triangle cross section of the second prisms 522A. In the illustrated modified example, the ratio of the base angles α1 and α2 is about 3:1.

A description will now be given of the projected image, i.e., the light distribution pattern, by the vehicle lighting fixture 1A.

Figure 7A:
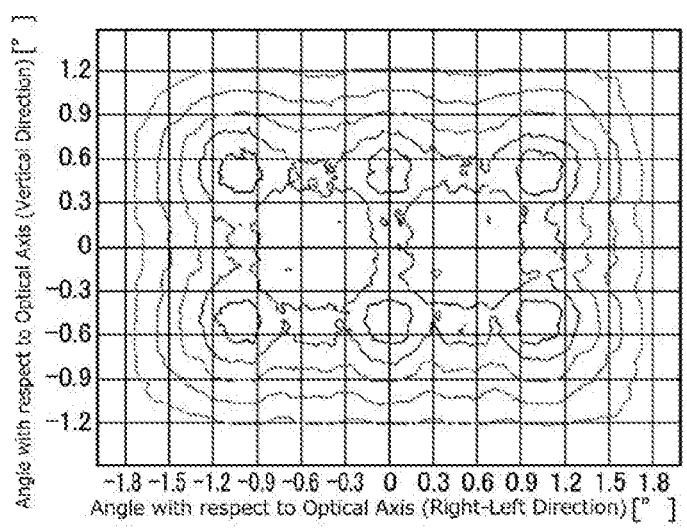
FIGS. 7A, 7B, and 7C are diagrams illustrating a case where the image shifter of the vehicle lighting fixture according to the modified example is used, FIG. 7A being a graph showing a light intensity distribution of a projected image on a virtual vertical screen, FIG. 7B being a graph showing the light intensity distribution in a left-right direction, and FIG. 7C being a graph showing the light intensity distribution in a vertical direction.
Figure 7B:
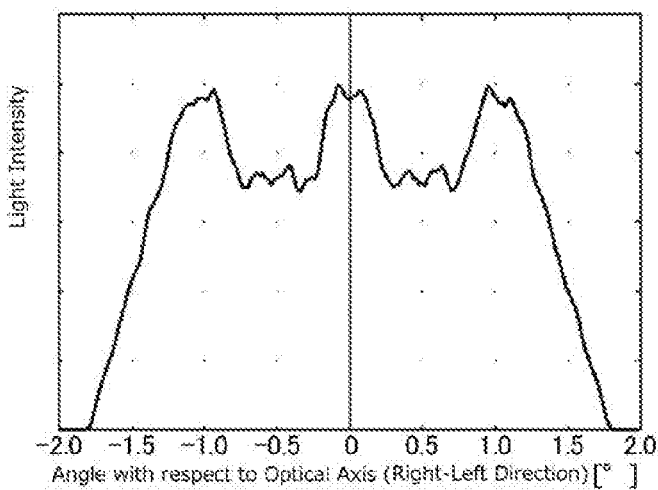
Figure 7C:
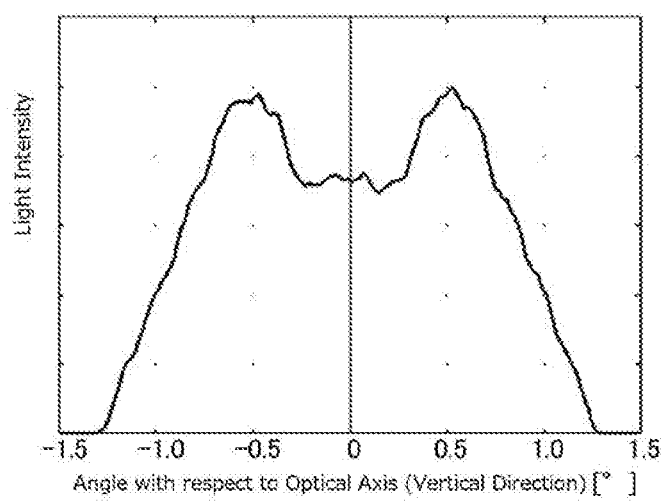

FIGS. 7A to 7C are diagrams showing light intensity distributions formed on a virtual vertical screen about 25 meters away from the front portion of the vehicle lighting fixture 1A. FIG. 7A is a diagram illustrating the light intensity distribution of a projected image on the virtual vertical screen, FIG. 7B is a diagram illustrating the light intensity distribution of the projected image in the left-right direction at a position of −0.5° below the optical axis X (vertically −0.5° position), and FIG. 7C is a diagram illustrating the light intensity distribution of the projected image in the vertical direction at a position passing the optical axis X (laterally 0° position).

In the vehicle lighting fixture 1A, the light emitted forward from the plurality of LED elements 21 of the LED array 2 can be projected forward by the two projector lenses 3 and 4 to form a predetermined projected image (light distribution pattern) in front of the lighting fixture.

In this case, the vehicle lighting fixture 1A of the modified example can widen the light source image in the vertical and lateral directions since the image shifter 5A can include the vertically arranged prisms 511A and 512A and the laterally arranged prisms 521A and 522A. As a result, the light intensity unevenness can be suppressed entirely.

Furthermore, the image shifter 5A of the modified example can include two types of prisms having different base angles and formed in the front and rear surfaces. These two types of prisms can enlarge (widen) the light source image by different magnifications. As a result, the light intensity unevenness can be suppressed more than that by the image shifter 5 of the above-mentioned exemplary embodiment.

Specifically, in the rear surface 51A of the image shifter 5A, the vertically arranged first prisms 511A and 512A can widen the light source image, but the first prisms 511A having an isosceles triangle cross section with the larger base angle can widen the light source image larger in the vertical direction than the second prisms 512A. Also in the front surface 52A of the image shifter 5A, the laterally arranged first prisms 521A, and 522A can widen the light source image as in the front surface 51A, but the first prisms 521A having an isosceles triangle cross section with the larger base angle can widen the light source image larger in the lateral direction than the second prisms 522A.

As a result, as illustrated in FIGS. 7A to 7C, the projected image formed in front of the lighting fixture 1A may have darkened areas corresponding to the gaps between the plurality of LED elements 21, but the valley of the darkened area is shallower than that formed by the previous exemplary embodiment with the image shifter 5 having the same prisms. That is, the darkened area has a certain light intensity higher than that formed by the image shifter 5, resulting in suppression of light intensity unevenness more effectively.

In the image shifter 5A of the modified example, the ratio of the base angle α1 of the first prisms 511A (521A) to the base angle α2 of the second prisms 512A (522A) can be set to about 3:1. This configuration can form the light source image as follows. Specifically, as illustrated in FIG. 8A, M represents the basic light source image. This basic light source image M can be widened (shifted) by the first prism by a width d on both sides to form a widened light source image M1. On the other hand, the basic light source image M can be widened (shifted) by the second prism by a width 3d on both sides to form a widened light source image M2.

The projected image can be formed by superimposing the light source images M1 and M2, resulting in the stepped light intensity distribution at equal intervals as illustrated in FIG. 8B. As illustrated, the projected image can have a light intensity distribution in which the light intensity is smoothly varied from the center to the periphery in the shifted direction.

As described above, the vehicle lighting fixture 1A can include the image shifter 5A having two types of prisms with different base angles formed in the respective surfaces.

Since the two types of prisms can expand (widen) the light source image with different magnifications, the resulting projected image can have the light intensity distribution with more suppressed light intensity unevenness. Thus, the resulting light distribution pattern by the plurality of LED elements 21 can be further suppressed in light intensity unevenness. When the two types of prisms can have the different isosceles triangle cross section with respective base angles $\alpha 1$ and $\alpha 2$ at a ratio of 3:1, the light intensity of the projected image can be smoothly varied in the shifted direction of the light source image.

The above-described exemplary embodiment and modified examples may be changed as appropriate without departing from the gist of the presently disclosed subject matter.

For example, it should be noted that the distribution (displacement) of prisms in the front and rear surfaces of the image shifter 5A is not limited to the illustrated one, but the different prisms may be arranged alternately. Furthermore, the number of types of prisms is not limited two, but three or more types prisms may be formed in the front and rear surfaces of the image shifter 5A.

The vehicle lighting fixture of the presently disclosed subject matter can be used as a tail lamp, a signal lamp, an indication lamp, and the like vehicle lamps in addition to a headlamp.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting fixture comprising:
a plurality of light sources having a light emitting direction and arranged in a predetermined arranging direction orthogonal to the light emitting direction;
a projector lens assembly disposed in front of the plurality of light sources and configured to project light emitted from the plurality of light sources forward; and
an optical lens disposed in an optical path from the plurality of light sources to a position forward of the projector lens assembly, the optical lens including a plurality of prisms configured to widen light source images of the plurality of light sources in the predetermined arranging direction,
the plurality of prisms each extend in a direction orthogonal to the arranging direction and are disposed side by side in the arranging direction,
the plurality of prisms are each formed to have a triangular cross section orthogonal to the direction in which the prisms extend, and include two types of prisms having mutually different base angles in the triangular cross section and formed in a same plane of the optical lens, and
the two types of prisms are configured such that a ratio of the base angles is 3:1.

2. The vehicle lighting fixture according to claim 1, wherein
the plurality of light sources are arranged in a matrix form in two arranging directions substantially orthogonal to each other, and
the optical lens has two sets of the plurality of prisms corresponding to the two arranging directions and formed in front and rear surfaces of the optical lens.

3. The vehicle lighting fixture according to claim 1, wherein
the projector lens assembly includes two projector lenses provided adjacent to each other in the light emitting direction, and
the optical lens is disposed in between the two projector lenses.

4. The vehicle lighting fixture according to claim 2, wherein
the projector lens assembly includes two projector lenses provided adjacent to each other in the light emitting direction, and
the optical lens is disposed in between the two projector lenses.

5. A vehicle lighting fixture comprising:
a plurality of light sources having a light emitting direction and arranged in at least a left-right direction orthogonal to the light emitting direction;
a projector lens assembly disposed in front of the plurality of light sources and configured to project light emitted from the plurality of light sources forward; and
an optical lens disposed in an optical path from the plurality of light sources to a position forward of the projector lens assembly, the optical lens including a plurality of prisms configured to widen light source images of the plurality of light sources in the left-right direction,
the plurality of prisms each extend in a direction orthogonal to the left-right direction and are disposed side by side in the left-right direction,
the plurality of prisms are each formed to have a triangular cross section orthogonal to the direction in which the prisms extend, and include two types of prisms having mutually different base angles in the triangular cross section, the two types of prisms being formed in a same plane of the optical lens and disposed side by side, and
the two types of prisms disposed side by side are configured such that a ratio of the base angles is 3:1.

6. The vehicle lighting fixture according to claim 5, wherein the plurality of light sources are arranged in a matrix form in two arranging directions substantially orthogonal to each other.

7. The vehicle lighting fixture according to claim 6, further comprising a plurality of second prisms extending in a direction orthogonal to the direction in which the plurality of prisms extend.

8. The vehicle lighting fixture according to claim 7, wherein the plurality of prisms are provided in one of front and rear surfaces of the optical lens and the plurality of second prisms are provided in the other of the front and rear surfaces of the optical lens.

9. The vehicle lighting fixture according to claim 7, wherein the two types of prisms are alternately formed.

10. The vehicle lighting fixture according to claim 8, wherein the two types of prisms are alternately formed.

* * * * *